(12) United States Patent
Yasuzaka

(10) Patent No.: US 10,857,873 B2
(45) Date of Patent: Dec. 8, 2020

(54) EVAPORATED FUEL TREATMENT DEVICE

(71) Applicant: DENSO CORPORATION, Kariya (JP)

(72) Inventor: Taiki Yasuzaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/575,625

(22) Filed: Sep. 19, 2019

(65) Prior Publication Data

US 2020/0101835 A1    Apr. 2, 2020

(30) Foreign Application Priority Data

Oct. 1, 2018  (JP) ................................. 2018-186327

(51) Int. Cl.
  *B60K 15/03* (2006.01)
  *F02M 55/00* (2006.01)
  *B60K 15/035* (2006.01)

(52) U.S. Cl.
  CPC ..... *B60K 15/03006* (2013.01); *F02M 55/002* (2013.01); *B60K 2015/03072* (2013.01); *B60K 2015/03585* (2013.01)

(58) Field of Classification Search
  CPC .............. B60K 15/03; B60K 15/03006; B60K 2015/03072; B60K 2015/03585
  See application file for complete search history.

(56) References Cited

U.S. PATENT DOCUMENTS 10,184,430 B2 * 1/2019 Watanabe .......... F02M 25/0818
2018/0171938 A1   6/2018 Watanabe et al.

* cited by examiner

*Primary Examiner* — Hieu T Vo
(74) *Attorney, Agent, or Firm* — Nixon & Vanderhye P.C.

(57) ABSTRACT

An evaporated fuel treatment device includes a fuel tank that stores fuel for an internal combustion engine, a canister that adsorbs evaporated fuel generated in the fuel tank, a pump that pressurizes and depressurizes a diagnostic target system including the fuel tank, a pressure detection unit that detects pressure in the diagnostic target system, a fuel state detection unit that detects a state of the fuel in the fuel tank, a leakage diagnosis unit that diagnoses leakages of evaporated fuel from the diagnostic target system, the diagnostic target system based on a change in a detection value detected by the pressure detection unit when the pump pressurizes or depressurizes the diagnostic target system, and a diagnosis determination unit that determines whether the leakage diagnosis unit performs the diagnosis based on a change in a state detection value detected by the fuel state detection unit.

5 Claims, 4 Drawing Sheets

EVAPORATED FUEL TREATMENT DEVICE

CROSS REFERENCE TO RELATED APPLICATION

The present application claims the benefit of priority from Japanese Patent Application No. 2018-186327 filed on Oct. 1, 2018. The entire disclosure of the above application is incorporated herein by reference.

TECHNICAL FIELD

The present disclosure relates to an evaporated fuel treatment device.

BACKGROUND

An evaporated fuel treatment device may treat evaporated fuel generated in a fuel tank of an internal combustion engine. A leakage diagnosis device may detect a leakage of evaporated fuel in the evaporated fuel treatment device.

SUMMARY

In one aspect of the present disclosure, an evaporated fuel treatment device includes a fuel tank that stores fuel for an internal combustion engine, a canister that adsorbs evaporated fuel generated in the fuel tank, a pump that pressurizes and depressurizes a diagnostic target system including the fuel tank, a pressure detection unit that detects pressure in the diagnostic target system, a fuel state detection unit that detects a state of the fuel in the fuel tank, a leakage diagnosis unit that diagnoses leakages of evaporated fuel from the diagnostic target system, the diagnostic target system based on a change in a detection value detected by the pressure detection unit when the pump pressurizes or depressurizes the diagnostic target system, and a diagnosis determination unit that determines whether the leakage diagnosis unit performs the diagnosis based on a change in a state detection value detected by the fuel state detection unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Hereinafter, embodiments of the present disclosure will be described.

First Embodiment

Figure 1:
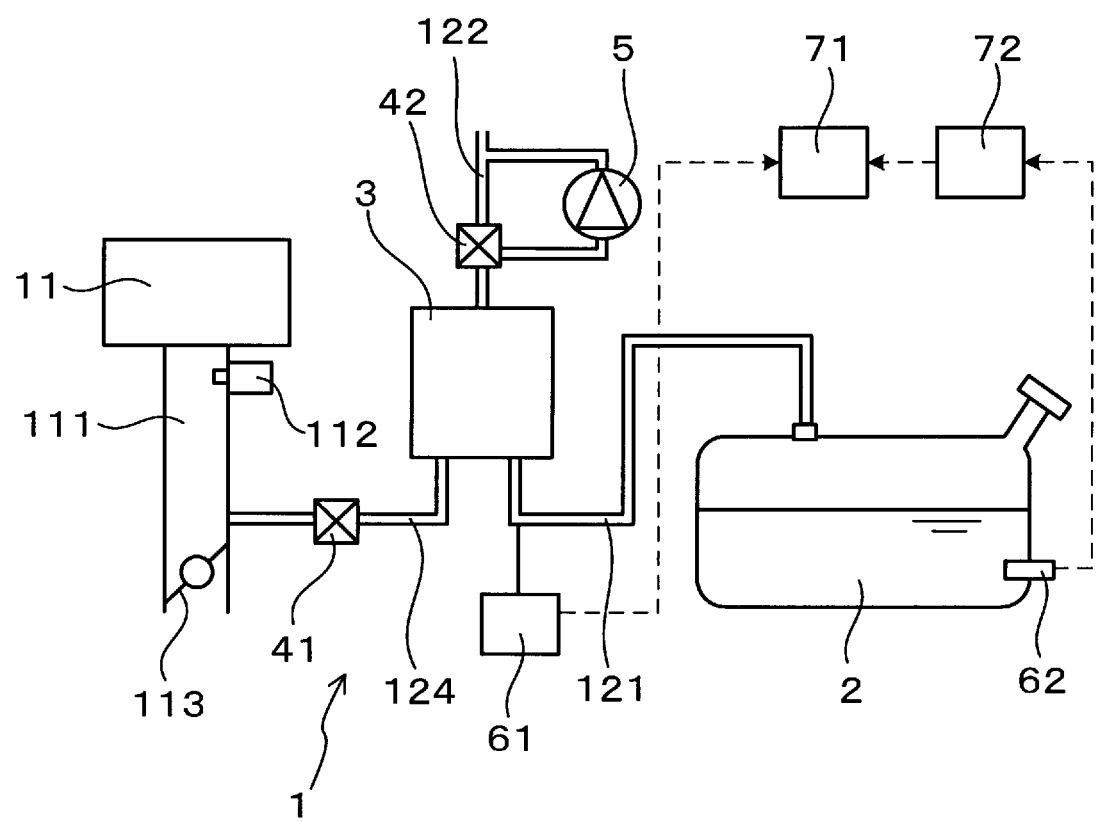
FIG. 1 is a diagram showing a structure of an evaporated fuel treatment device according to a first embodiment.
Figure 2:
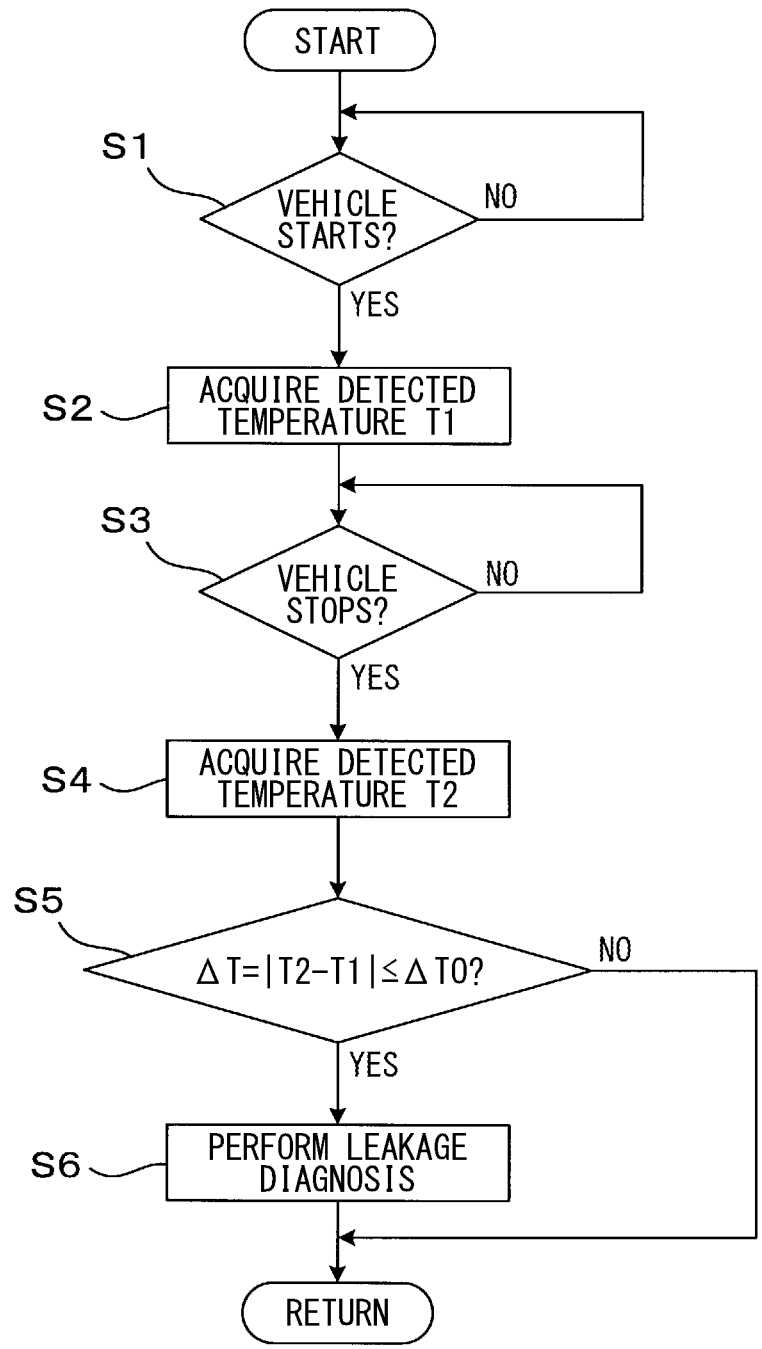
FIG. 2 is a flowchart showing a process of a diagnosis determination unit according to the first embodiment.

A first embodiment of the present disclosure regarding an evaporated fuel treatment device will be described with reference to FIGS. 1 to 2. As shown in FIG. 1, an evaporated fuel treatment device 1 according to the first embodiment includes a fuel tank 2, a canister 3, a purge passage 124, pump 5, a pressure detection unit 61, a fuel state detection unit 62, a leakage diagnosis unit 71, and a diagnosis determination unit 72.

The fuel tank 2 stores fuel for an internal combustion engine 11. The canister 3 adsorbs evaporated fuel generated in the fuel tank 2. The purge passage 124 guides the evaporated fuel absorbed by the canister 3 to flow to an intake passage 111. The pump 5 pressurizes and depressurizes a diagnostic target system including the fuel tank 2.

The pressure detection unit 61 is preferably a pressure sensor that directly measures the pressure of a gas or liquid and outputs a corresponding electrical signal. In alternative embodiments, the pressure detection unit 61 may be implemented as an indirect sensor that measures a different physical quantity which correlates with pressure. The pressure detection unit 61 detects pressure in the diagnostic target system.

The fuel state detection unit 62 is preferably a temperature sensor that directly measures a temperature of a gas or liquid and outputs a corresponding signal. The fuel state detection unit 62 detects a state of the fuel in the fuel tank 2.

The leakage diagnosis unit 71 and the diagnosis determination unit 72 are control modules which are preferably implemented as an electronic control unit including a processor and a memory. The processor reads computer-executable software stored in the memory to control the other components of the evaporated fuel treatment device 1 in order to perform the functions described below with respect to the leakage diagnosis unit 71 and the diagnosis determination unit 72. In alternative embodiments, the leakage diagnosis unit 71 and the diagnosis determination unit 72 may be implemented partially or wholly as hardware logic circuits, for example as application-specific integrated circuits or programmable gate arrays. The leakage diagnosis unit 71 diagnoses leakages of evaporated fuel from the diagnostic target system, based on changes in detection values detected by the pressure detection unit 61 when the pump 5 pressurizes or depressurizes the diagnostic target system. The diagnosis determination unit 72 determines whether or not the leakage diagnosis unit 71 performs a diagnosis based on changes in a state detection value detected by the fuel state detection unit 62.

As described below, changes in detection values detected by the pressure detection unit 61 when the diagnostic target system is pressurized or depressurized may be changes in values detected after the pump stopped just after pressurizing or depressurizing to a predetermined pressure, or may be changes in values detected while the pump pressurizes or depressurizes. In the first embodiment, an example is provided in which the diagnosis is based on the former change.

The fuel tank 2 is connected to the canister 3 through an evaporated fuel passage 121. That is, evaporated fuel evaporated in the fuel tank 2 flows to the canister 3 through the evaporated fuel passage 121 connected to an upper side of the fuel tank 2. In the first embodiment, the pressure detection unit 61 is provided at the evaporated fuel passage 121. However, the location of the pressure detection unit 61 is not limited as above, and for example may be provided at the fuel tank 2.

The purge passage 124 communicates the canister 3 to the intake passage 111 of the internal combustion engine 11. The purge passage 124 includes a purge valve 41. By opening and closing the purge valve 41, the supply of the evaporated fuel from the canister 3 to the intake passage 111 may be controlled. The injector 112 is provided at the intake passage 111 and placed near an intake port of the internal combustion engine 11. The purge passage 124 is connected to the intake passage 111 at a downstream side of a throttle valve 113.

A vent passage 122 is connected to the canister 3 and takes in open air. A vent valve 42 is provided in the vent passage 122. The pump 5 is connected in parallel with the vent passage 122. The vent valve 42 is a three way valve and is connected to the pump 5 in addition to the canister 3 and open air. The vent valve 42 is configured to switch between a state in which the canister 3 is connected to open air, a state in which the canister 3 is connected to the pump 5, and a state the canister is not connected to either open air or the pump 5.

In the first embodiment, the pump 5 discharges gas from the canister 3 toward open air. By closing the purge valve 41 and the vent valve 42, it is possible to form a closed system including both the canister 3 and the fuel tank 2. In the first embodiment, the closed system described above corresponds to the diagnostic target system. Operation of the pump 5 is started while the purge valve 41 is closed and the canister 3 is communicated to the pump 5 through the vent valve 42. Due to this, pressure in the diagnostic target system may be reduced. Subsequently, the vent valve 42 is closed, and as a result the diagnostic target system may be sealed under negative pressure. In the first embodiment, each of the purge valve 41 and the vent valve 42 is an electromagnetic valve.

In the first embodiment, the fuel state detection unit 62 detects a temperature of the fuel in the fuel tank 2. That is, the state detection value is a detection value of the temperature of the fuel in the fuel tank 2. This detection value is referred to as a detected temperature where appropriate hereinafter. In the first embodiment, the fuel state detection unit 62 is a temperature sensor and is referred to as a temperature sensor 62 where appropriate. The temperature sensor 62 detects the temperature of the fuel in liquid.

The evaporated fuel treatment device 1 according to the first embodiment is equipped in a vehicle. The diagnosis determination unit 72 determines whether or not the leakage diagnosis unit 71 performs a diagnosis, based on a difference between a state detection value at a starting time point of the vehicle (detected temperature T1) and a state detection value after stopping the vehicle (detected temperature T2).

An example of a process in which the diagnosis determination unit 72 determines whether or not the diagnosis is performed will be described with reference to a flowchart in FIG. 2. First, when a start of the vehicle is detected, a measured value of the fuel temperature that is, the detected temperature T1 is acquired by the temperature sensor 62 (with reference to steps S1 and S2). In a case where the vehicle is a vehicle that drives only by the internal combustion engine, the start of the vehicle may mean a start of an engine, or the like. In a case where the vehicle is a hybrid vehicle or the like, the start of the vehicle may mean a start of a system, or the like. Therefore, the vehicle may be started by detecting ignition signals or on signals of a start switch of the hybrid vehicle (in other words, start signals of a system), or the like. The detected temperature T1 is acquired at this starting time point.

Next, when a stoppage of the vehicle is detected, a measured value of the fuel temperature detected by the temperature sensor 62, that is, the detected temperature T2 is acquired (with reference to step S3 and S4). The stoppage of the vehicle may mean a stoppage of the engine in the vehicle (internal combustion engine), a system stoppage of the hybrid vehicle, or the like. That is, the stoppage of the vehicle may be detected by these signals associated with stoppage. The detected temperature T2 may be acquired, for example, at the time of stopping the vehicle or after a predetermined time passed since the time of stopping the vehicle.

Subsequently, the diagnosis determination unit 72 determines whether or not a change $\Delta T$ between the detected temperature T2 and the detected temperature T1 is equal to or below a threshold $\Delta T0$ (with reference to step S5). The change $\Delta T$ is an absolute value and is defined as follows.

$$\Delta T = |T2 - T1|$$

When the change $\Delta T$ is equal to or below the threshold $\Delta T0$, the leakage diagnosis unit 71 performs the diagnosis (with reference to step S6). On the other hand, when the change $\Delta T$ is not equal to or below the threshold $\Delta T0$, that is, when the change $\Delta T$ is over the threshold $\Delta T0$, the leakage diagnosis unit 71 does not perform the diagnosis. The threshold $\Delta T0$ is appropriately set such that a predetermined diagnostic accuracy of the leakage is secured.

Operational effects in the first embodiment will be described below. The evaporated fuel treatment device 1 includes the diagnosis determination unit 72. The diagnosis determination unit 72 determines whether or not the leakage diagnosis unit 71 performs a diagnosis based on changes in a state detection value detected by the fuel state detection unit 62.

That is, based on the change $\Delta T$ between the detected temperatures detected by the temperature sensor 62, the diagnosis determination unit 72 determines whether or not the leakage diagnosis unit 71 performs a diagnosis. More specifically, in a case where the change $\Delta T$ is equal to or below the threshold $\Delta T0$, the leakage diagnosis is performed. In a case where the change $\Delta T$ is over the threshold $\Delta T0$, the leakage diagnosis is not performed. That is, in a case where a change of the fuel temperature is large, the state of the fuel in the fuel tank 2 is unstable. For example, when the change of the fuel temperature is large, the volatility of the fuel tends to change. Accordingly, an internal pressure in the fuel tank tends to be more variable due to the volatilization of the fuel. It may be difficult to detect correctly a degree of the leakage of the evaporated fuel from the diagnostic target system, which is the diagnostic target of the leakage diagnosis.

The leakage diagnosis unit 71 may be configured to, for example, diagnose whether or not leakage of the evaporated fuel from a small hole or the like generated as a defect on the fuel tank 2 or the like exceeds allowed range. This leakage diagnosis may be performed based on, for example, change over time of internal pressure in the diagnostic target system. If the change over time of the internal pressure is affected by the state of the evaporation of the fuel in the fuel tank 2, the leakage might be determined as out of the allowable range even though the leakage is actually within the allowable range, or the leakage may be determined as within the allowable range even though the leakage is actually out of the allowable range. In this way, when the state of the evaporation of the fuel changes, the diagnostic accuracy may be decreased. Therefore, in a situation as described above, it is preferable not to perform the leakage diagnosis.

According to the first embodiment, it is possible to avoid performing a leakage diagnosis in a state where the diagnostic accuracy is decreased. As such, it is possible to select a situation in which high accuracy diagnosis may be performed, and subsequently perform the leakage diagnosis. As a result, the leakage diagnosis may be performed with high accuracy.

Further, the diagnosis determination unit 72 determines whether or not the leakage diagnosis unit 71 performs a diagnosis based on a difference between the state detection value at the starting time point of the vehicle (detected temperature T1) and the state detection value after stopping the vehicle (detected temperature T2). Therefore, the leakage diagnosis with high accuracy may be performed regularly. After a starting the vehicle, as the vehicle is driven and the internal combustion engine operates, the environment in the fuel tank 2 may change. Further, the situation in the diagnostic target system may change. Therefore, by detecting the state of the fuel at the starting time point and after stopping the vehicle and by evaluating the difference between the state detection values, it is possible to effectively determine whether or not the leakage diagnosis should be performed. In a case where the vehicle is a hybrid vehicle or the like, the diagnosis determination unit 72 is able to perform the determination regardless of whether the internal combustion engine is used for driving.

Further, the fuel state detection unit 62 detects the temperature of the fuel in the fuel tank 2. The state detection value is a detected value of the temperature of the fuel in the fuel tank 2. In other words, whether or not the leakage diagnosis is performed is determined based on changes in the temperature of the fuel in the fuel tank 2. Therefore, a degree of the influence of the state of the fuel to the leakage diagnosis may be easily determined with high accuracy. That is, whether or not the leakage diagnosis can be performed with high accuracy may be determined more easily and accurately.

The diagnostic target system includes both the fuel tank 2 and the canister 3. As such, it is possible to diagnose the leakage of the evaporated fuel from the fuel tank 2 and the canister 3.

Due to the above, according to the first embodiment, it is possible to provide an evaporated fuel treatment device that performs a leakage diagnosis with high accuracy.

Second Embodiment

Figure 3:
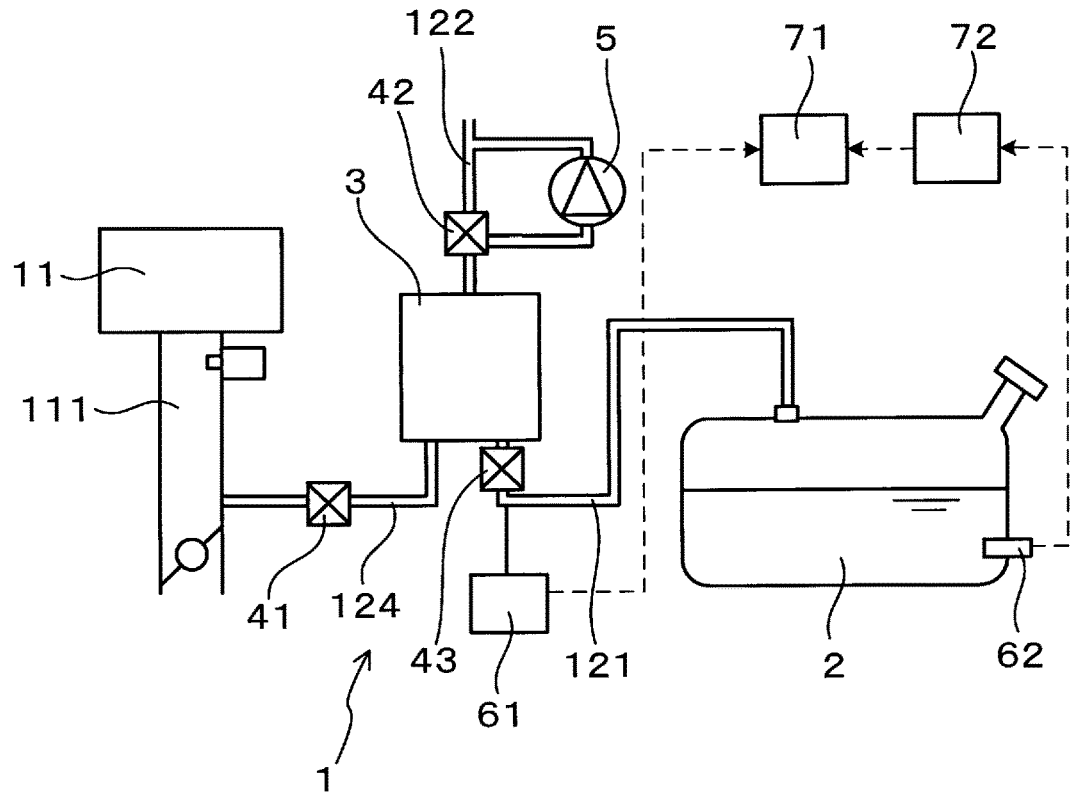
FIG. 3 is a diagram showing a structure of the evaporated fuel treatment device according to a second embodiment.

In a second embodiment, as shown in FIG. 3, a closing valve 43 is provided in the evaporated fuel passage 121. That is, in the evaporated fuel treatment device 1 in this embodiment, the closing valve 43 is provided in the evaporated fuel passage 121 between the fuel tank 2 and the canister 3 so as to be able to open and close the evaporated fuel passage 121. The closing valve 43 is configured to switch between allowing or cutting off the communication between the fuel tank 2 and the canister 3.

The pressure detection unit 61 is placed at the evaporated fuel passage 121 and closer to the fuel tank 2 than to the closing valve 43. The closing valve 43 may be a solenoid valve, or the like. The passage between the fuel tank 2 and the canister 3 can be cut off by closing the closing valve 43. Due to this, the fuel tank 2 may be set to be in a closed state.

Other aspects are same as those in the first embodiment. The same reference numerals between embodiments are given to the same structures unless otherwise indicated.

In the second embodiment, the leakage diagnosis by the leakage diagnosis unit 71 can be performed at each of a side of the fuel tank 2 and a side of the canister 3. For example, first, the vent valve 42 is set so as to allow communication from the pump 5 to the canister 3, while the purge valve 41 is closed and the closing valve 43 is opened. In this state, the operation of the pump 5 is started, and the closed system that includes the canister 3 and the fuel tank 2 is depressurized.

The closed system is depressurized to the predetermined pressure, and subsequently, the vent valve 42 and the closing valve 43 are closed. Next, this state is maintained for a predetermined time, and pressure changes are measured by the pressure detection unit 61. That is, the pressure changes in the diagnostic target system at the side closer to the fuel tank 2 than to the closing valve 43 is measured. In this way, it is possible to diagnose the leakage of the evaporated fuel from the diagnostic target system at the side closer to the fuel tank 2 than to the closing valve 43. For convenience of explanation, the above is referred to as a first leakage diagnosis.

Next, in a case where the leakage diagnosis unit 71 determined that the leakage of the evaporated fuel from the diagnostic target system at the side closer to the fuel tank 2 than to the closing valve 43 has not occurred or is within the allowable range, subsequently, the closed valve 43 is opened. Due to this, it is possible to close off the diagnostic target system that includes the fuel tank 2 and the canister 3 into a closed system. At this point, if required, the pump 5 depressurizes the diagnostic target system to the predetermined pressure again. In this state, the pressure changes in the diagnostic target system during a predetermined time are measured by the pressure detection unit 61 again. In this way, it is possible to diagnose the leakage of the evaporated fuel from the diagnostic target system that includes the fuel tank 2 and the canister 3. For convenience of explanation, the above is referred to as a second leakage diagnosis.

As described above, when the leakage diagnosis unit 71 diagnoses that the leakage has not occurred or is within the allowable range in the first leakage diagnosis, and that the leakage has occurred in the second leakage diagnoses, it is possible to determine that the leakage has occurred in the closed system at the side closer to the canister 3 than to the closed valve 43. In this way, in the second embodiment, a position of the evaporated fuel leaks may be identified. In addition, the second embodiment has operational effects same as the first embodiment.

Third Embodiment

Figure 4:
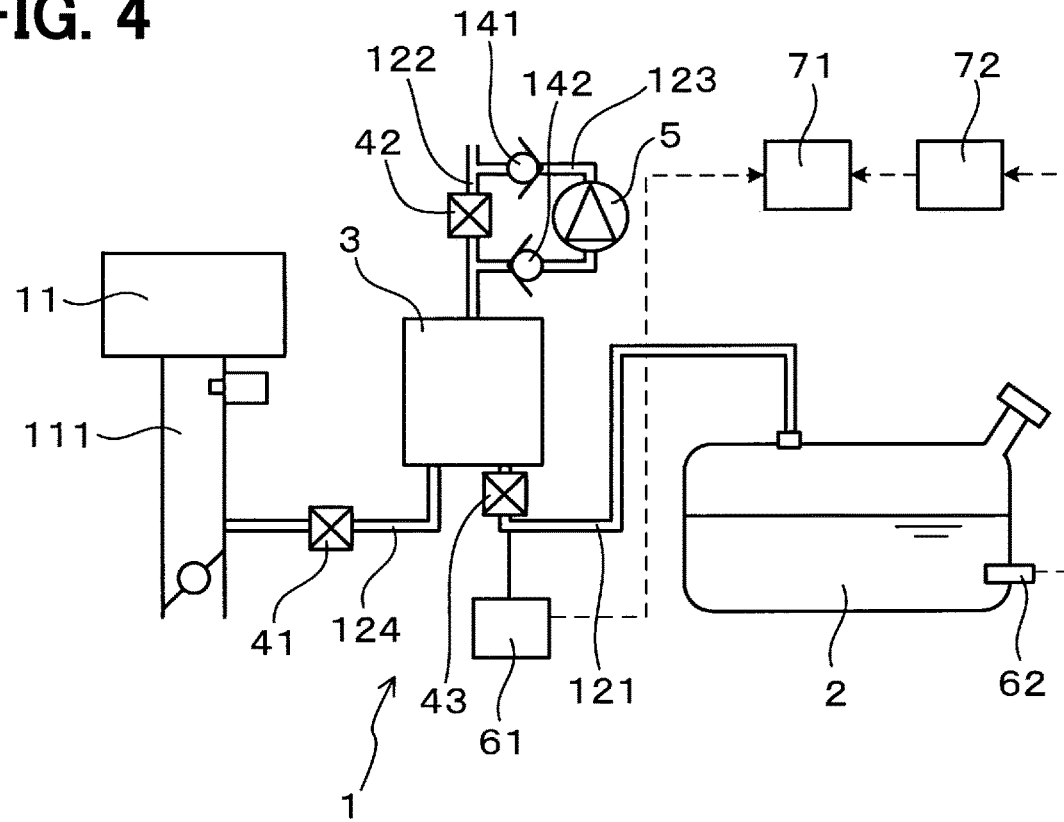
FIG. 4 is a diagram showing a structure of the evaporated fuel treatment device according to a third embodiment.

In a third embodiment, as shown in FIG. 4, check valves 141, 142 are provided in an upstream side and a downstream side of the pump 5, respectively. The pump 5 is connected to the vent passage 122 in parallel.

In the third embodiment, one end of a bypass passage 123 is connected to the vent passage 122 closer to open air than to the vent valve 42. On the other hand, the other end of the bypass passage 123 is connected to the vent passage 122 closer to the canister 3 than to the vent valve 42. The check valve 141 is placed in the bypass passage 123 closer to open air than to the pump 5. The check valve 142 is placed in the bypass passage 123 closer to the canister 3 than to the pump 5. When gas flows from the canister 3 to open air, the check valves 141, 142 open. When gas flows from open air to the canister 3, the check valves 141, 142 are closed. That is, the check valves 141, 142 operate so as to pass the gas that flows by the operation of the pump 5 and interrupt the gas flowing in the opposite direction. Other aspects are same as those in the second embodiment.

In the third embodiment, when open air flows into the canister 3, the vent valve 42 opens. Due to this, the open air may flow into the canister 3 through the vent passage 122 and the vent valve 42. On the other hand, the check valves 141, 142 are kept closed. Therefore, a pressure loss at this point may be decreased, and open air may flow in smoothly and easily.

When the leakage diagnosis in the diagnostic target system is performed, the vent valve 42 and the purge valve 41 are closed, and the operation of the pump 5 is started. At this point, the check valves 141, 142 open and the diagnostic target system may be depressurized smoothly. After the pump 5 stops, the check valves 141, 142 are closed, and as a result, the diagnostic target system is sealed under negative pressure. In addition, the third embodiment has operational effects same as the second embodiment.

Fourth Embodiment

Figure 5:
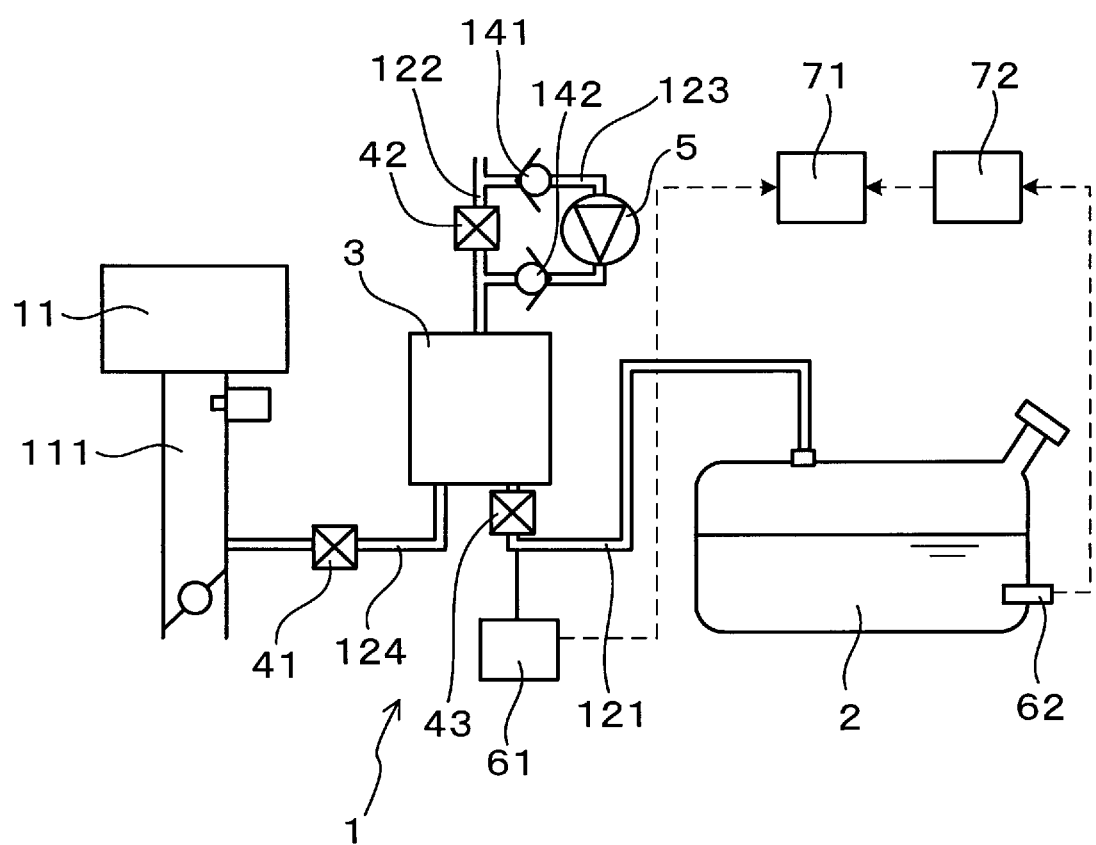
FIG. 5 is a diagram showing a structure of the evaporated fuel treatment device according to a fourth embodiment.

In a fourth embodiment, as shown in FIG. 5, the evaporated fuel treatment device 1 includes the pump 5 placed so as to be able to pressurize the diagnostic target system.

In the fourth embodiment, a direction of the pump 5 and directions of the check valves 141, 142 are opposite to those in the third embodiment. That is, the pump 5 is configured to send gas (open air) from open air to the canister. When gas flows from the canister 3 to open air, the check valves 141, 142 are closed. When gas flows from open air side to the canister 3, the check valves 141, 142 are open. Other aspects are same as those in the third embodiment.

In the fourth embodiment, in a case where the leakage diagnosis unit 71 performs the leakage diagnosis, the pump 5 pressurizes the diagnostic target system. For example, the closed valve 43 opens, and the purge valve 41 and the vent valve 42 are closed. In this state, the operation of the pump 5 is started. Due to this, the diagnostic target system that includes the fuel tank 2 and the canister 3 is pressurized to a predetermined pressure.

In this state, the diagnostic target system is left for a predetermined time. At this point, the check valves 141, 142 are closed, and as a result, the leakage of internal pressure through the pump 5 may be restricted. The pressure detection unit 61 measures changes of pressure in the diagnostic target system over a predetermined time. Based on this pressure change, the leakage of the evaporated fuel from the diagnostic target system may be diagnosed.

In the fourth embodiment, as described above, the leakage diagnostic may be performed in positive pressure in the diagnostic target system. In addition, the fourth embodiment has operational effects same as the third embodiment.

In the fourth embodiment, the temperature of fuel is adapted as a state of the fuel in the fuel tank and detected by the fuel state detection unit. However, not only the temperature of the fuel, but also another physical quantity such as a concentration of the evaporated fuel in the fuel tank may be adapted as the state of the fuel in the fuel tank. For example, in alternative embodiments, the fuel state detection unit 2 may be implemented as a fuel concentrations sensor or a fuel density sensor instead. For this reason, the fuel state detection unit may be generally referred to as a fuel state sensor that detects a volatility value of fuel, and a threshold comparison for the output value of the fuel state sensor may be generally referred to as a predetermined volatility threshold. However, the state of the fuel to be detected is preferred to be a physical quantity related to a performance of the evaporation of the fuel in the fuel tank. In particular, as described above, the temperature of the fuel is preferred in a viewpoint of accuracy.

To more clearly appreciate the effects of the embodiments described in this disclosure, consider a comparative example diagnosis device of an evaporated fuel treatment device configured to select a first leakage diagnosis or a second leakage diagnosis according to a temperature difference between a fuel temperature of the internal combustion engine prior to starting operation and a fuel temperature of the internal combustion engine after operating.

In the comparative example, the diagnosis device considers that a pressure in a fuel tank is positive or negative when a temperature difference exists to some extent between the fuel temperatures. The diagnosis device uses this positive pressure or negative pressure to perform a leakage diagnosis. This is the first leakage diagnosis. On the other hand, in a case where the temperature difference between the fuel temperatures is small, a pump is used to increase or decrease the pressure in the fuel tank, and the diagnosis device conducts the leakage diagnosis with the positive pressure or the negative pressure. This is the second leakage diagnosis.

However, the diagnostic accuracy of the comparative example leakage diagnosis may be improved. The volatility of the fuel in the fuel tank changes depending on states such as fuel temperature, concentration of evaporated fuel, and the like. That is, the behavior of pressure changes in the tank might vary according to the state of the fuel in the fuel tank. As such, even if similar amounts of gas are leaked from a diagnostic target system including the fuel tank, the internal pressure might be different according to the state of the fuel in the fuel tank. Therefore, in a case where the state of the fuel in the fuel tank is unstable, the internal pressure is more variable due to the state of the fuel, and it might be difficult to perform the leakage diagnosis with high accuracy.

In contrast, according to an aspect of the present disclosure, an evaporated fuel treatment device is configured to perform a leakage diagnosis with high accuracy.

The evaporated fuel treatment device includes a fuel tank, a canister, a pump, a pressure detection unit, a fuel state detection unit, a leakage diagnosis unit, and a diagnosis detection unit. The fuel tank stores fuel for an internal combustion engine. The canister adsorbs evaporated fuel generated in the fuel tank. The pump pressurizes or depressurizes a diagnostic target system including the fuel tank. The pressure detection unit detects pressure in the diagnostic target system. The fuel state detection unit detects a state of the fuel in the fuel tank. The leakage diagnosis unit diagnoses leakages of evaporated fuel from the diagnostic target system, based on changes in detection values detected by the pressure detection unit when the pump pressurizes or depressurizes the diagnostic target system. The diagnosis determination unit determines whether the leakage diagnosis unit performs a diagnosis based on changes in a state detection value detected by the fuel state detection unit.

The evaporated fuel treatment device includes the diagnosis determination unit. The diagnosis determination unit determines whether or not the leakage diagnosis unit diagnoses based on changes in a state detection value detected by the fuel state detection unit. Due to this, a situation that a diagnosis with high accuracy can be performed is selected, and the leakage diagnosis may be performed. Therefore, the leakage diagnosis with high accuracy may be performed.

As described above, an evaporated fuel treatment device according to the present disclosure is able to perform a leakage diagnosis with high accuracy.

The plurality of embodiments described above may be combined with each other where appropriate. For example, the pump placed to pressurize and described in the fourth embodiment may be adapted to a system such as the first embodiment or the second embodiment. In addition, as a method for the leakage diagnosis by the leakage diagnosis unit, a method in which a change of the internal pressure is measured after depressurizing or pressurizing to a predetermined pressure and waiting for a period of time is described. However, a method for leakage diagnosis is not limited to the above. The leakage may be diagnosed by measuring a change of internal pressure while depressurizing and the pressurizing at a predetermined output of the pump, for example.

The present disclosure is not limited to the preferred embodiments. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. An evaporated fuel treatment device comprising:
   a fuel tank that stores fuel for an internal combustion engine;
   a canister that adsorbs evaporated fuel generated in the fuel tank;
   a pump that pressurizes and depressurizes a diagnostic target system including the fuel tank;
   a pressure detection unit that detects pressure in the diagnostic target system;
   a fuel state detection unit that detects a state of the fuel in the fuel tank;
   a leakage diagnosis unit that diagnoses leakages of evaporated fuel from the diagnostic target system, the diagnostic target system based on a change in a detection value detected by the pressure detection unit when the pump pressurizes or depressurizes the diagnostic target system; and
   a diagnosis determination unit that determines whether the leakage diagnosis unit performs the diagnosis based on a change in a state detection value detected by the fuel state detection unit.

2. The evaporated fuel treatment device according to claim 1, wherein
   the evaporated fuel treatment device is equipped to a vehicle, and
   the diagnosis determination unit determines whether the leakage diagnosis unit performs a diagnosis based on a difference between the state detection value at a starting time point of the vehicle and the state detection value after stopping the vehicle.

3. The evaporated fuel treatment device according to claim 1, wherein
   the fuel state detection unit detects a temperature of the fuel in the fuel tank,
   the state detection value is a detection value of the temperature of the fuel in the fuel tank.

4. The evaporated fuel treatment device according to claim 1, wherein
   the diagnostic target system includes both the fuel tank and the canister.

5. An evaporated fuel treatment device comprising:
   a fuel tank that stores fuel for an internal combustion engine;
   a canister that adsorbs evaporated fuel generated in the fuel tank;
   a pump configured to pressurize and depressurize the fuel tank;
   a pressure sensor configured to detect pressure in the fuel tank;
   a fuel state sensor configured to detect a volatility value of the fuel in the fuel tank, the volatility value being at least one of a fuel temperature, a fuel concentration, or a fuel density; and
   a controller circuit coupled to the pressure sensor and the fuel state sensor, the controller circuit being configured to:
      determine whether a change over time in the volatility value detected by the fuel state sensor exceeds a predetermined volatility threshold, and
      when the change over time in the volatility value is determined to be equal to or less than the predetermined volatility threshold, perform a diagnosis of evaporate fuel from the fuel tank based on a change over time in the pressure detected by the fuel state sensor.

\* \* \* \* \*